United States Patent [19]

Smolinski

[11] 4,170,272
[45] Oct. 9, 1979

[54] FRAME FOR A CHOPPER-TYPE MOTORCYCLE

[76] Inventor: Donald E. Smolinski, 6616 Horseshoe Dr., Clinton, Md. 20735

[21] Appl. No.: 880,548

[22] Filed: Feb. 23, 1978

[51] Int. Cl.² .............................................. B62K 11/02
[52] U.S. Cl. .................................... 180/227; 180/228
[58] Field of Search ......................... 180/32, 33 A, 35; 280/281 R, 283

[56] References Cited

U.S. PATENT DOCUMENTS

| | | | |
|---|---|---|---|
| 3,508,765 | 4/1970 | Bauer et al. | 280/281 R |
| 3,542,146 | 11/1970 | Hooper et al. | 180/33 A |
| 3,616,870 | 11/1971 | Kramer | 180/32 |
| 3,945,463 | 3/1976 | Okano et al. | 180/35 X |
| 4,055,229 | 10/1977 | Lindsay | 180/32 |

*Primary Examiner*—Joseph F. Peters, Jr.
*Assistant Examiner*—Michael Mar
*Attorney, Agent, or Firm*—Shoemaker and Mattare, Ltd.

[57] ABSTRACT

A unitary, integral frame for a chopper-type motorcycle which includes a rear strut to which is connected a shock absorber. The seat section of the motorcycle frame is beneath the plane of the steering head and the shock absorber is connected to the frame at a location spaced apart from the seat section.

9 Claims, 5 Drawing Figures

FRAME FOR A CHOPPER-TYPE MOTORCYCLE

BACKGROUND OF THE INVENTION

The present invention relates in general to motorcycles, and, more particularly, to chopper-type motorcycles.

The chopper-type motorcycle, characterized by the sharply inclined backbone and the positioning of the driver's seat beneath the plane of the steering head, has gained much popularity in recent years. All choppers of which applicant is aware have the backbone element of the frame connected to the steering head at one end and to the rear wheel axle at the other end. The driver's seat is mounted on the backbone, and with such a connection, road shocks and vibration are transmitted directly to the driver, making the ride uncomfortable. This direct transmission of shock and vibration to the driver may even result in unsafe features due to many factors, such as driver fatigue or the like.

The stock motorcycle has the frame backbone oriented essentially horizontally and the driver's seat is therefore positioned in a horizontal plane which is common to the steering head. The stock motorcycles often have shock absorbers which connect the frame to the wheel axles and the ride is thus smooth relative to the above-discussed choppers.

The motorcycle embodying the teaching of the present invention combines the distinctive appearance of a chopper-type motorcycle with the smooth, stable, comfortable ride of the stock-type motorcycle.

SUMMARY OF THE INVENTION

The motorcycle embodying the teaching of the present invention has the driver's seat positioned in chopper style and produces a smooth, stable and comfortable stock-type ride.

The motorcycle has a unitary, integral frame comprising a steering head to which is attached a pair of sideways declining down tubes and a rearwardly declining backbone. The down tubes are each connected to one of a pair of lower axially extending spanner tubes, each of which is, in turn, connected to one of a pair of upwardly and rearwardly inclined riser tubes. The riser tubes are connected to the backbone by a plurality of frame elements which include a pair of integral, unitary rear struts, each having an upwardly curved rear fender engaging tail section connected to a furcated, yoke-like, section which includes an upwardly extending ear and a downwardly extending ear, and a pair of forwardly convergent seat rails which are welded to the backbone at the intersection thereof. An upper cross brace is attached to the upwardly extending ears of the furcated section and a bottom cross brace is attached to the frame spanner tubes. The backbone includes a top section connected to an upright section by an arcuate corner. The upright backbone section is attached at the lower terminal end thereof to the bottom cross brace, and may be attached to the upper cross brace at the arcuate corner section thereof.

A pair of swing arm plates are each attached to a riser tube and to a corresponding downwardly extending ear, and each has connected thereto a horizontal swing arm to couple the frame to the motorcycle rear wheel. A pair of shock absorbers are each connected in the usual manner at the lower end thereof to the rear wheel. The shock absorbers are connected at the upper end thereof to the upwardly curved body section of the rear strut.

The motorcycle driver seat section is located at the convergence of the seat rails, the top section of the backbone and the top cross brace and is spaced apart from the point of connection between the rear strut and the shock absorber. In the preferred embodiment, the plane of the seat is below the point at which the shock absorbers are connected to the rear struts to prevent road shocks and/or vibration from being transmitted directly to the driver from below the seat.

Road shocks and vibration are absorbed by the shock absorber and any shock or vibration transmitted to the frame is partially absorbed thereby without direct transmission to the driver. The frame is unitary and integral, yet, any shock or vibration transmitted thereto is cushioned by a force parallelogram. The unitary and integral nature of the frame effectively distributes shocks and vibration throughout the frame. Thus, the frame is strong and reliable as there will be no points thereon whereat stresses are unduly concentrated, and the motorcycle ride will be smooth and stable as shocks and vibration are either absorbed or evenly distributed throughout the entire frame. Heretofore, the frame construction of chopper-type motorcycles caused road induced shocks and/or vibration to be concentrated at or near the driver's seat, thereby producing a very uncomfortable and fatiguing ride. The stress concentration of known chopper frames may even produce unreliability under certain conditions.

The backbone is sharply declined from the front of the motorcycle to the rear thereof, the driver's seat is located beneath the plane of the steering head, and thus the motorcycle is a chopper-type motorcycle. Because the point of connection between the frame and the motorcycle rear wheel is spaced apart from the driver's seat, and preferably is above the plane of the driver's seat, any road shocks or vibration is absorbed without undue stress on the driver. In fact, because the rear struts are connected to the rear fender, further shock absorbing systems can be integrated into the motorcycle to produce a still smoother and more stable ride. Thus, because of the inclusion of shock absorbers, and the position and orientation thereof and the type of connection between the shocks and the frame, the chopper-type motorcycle embodying the teaching of the present invention provides a ride similar in smoothness and stability to the ride provided by a stock-type motorcycle, while retaining the distinctive styling and other features of a chopper-type motorcycle.

OBJECTS OF THE INVENTION

It is, therefore, a main object of the present invention to provide a chopper-type motorcycle which has a smooth ride.

It is another objct of the present invention to provide a chopper type motorcycle with a stable ride.

It is a further object of the present invention to provide a unitary, integral frame for a chopper-type motorcycle.

It is yet another object of the present invention to provide a strong, lightweight frame for a chopper-type motorcycle.

It is yet a further object of the present invention to provide a chopper-type motorcycle frame wherein no stress concentration points are present and stresses are evenly distributed throughout the frame.

These together with other objects and advantages which will become subsequently apparent reside in the details of construction and operation as more fully hereinafter described and claimed, reference being had to the accompanying drawings forming part thereof, wherein like reference numerals refer to like parts throughout.

DETAILED DESCRIPTION OF THE INVENTION

Figure 1:
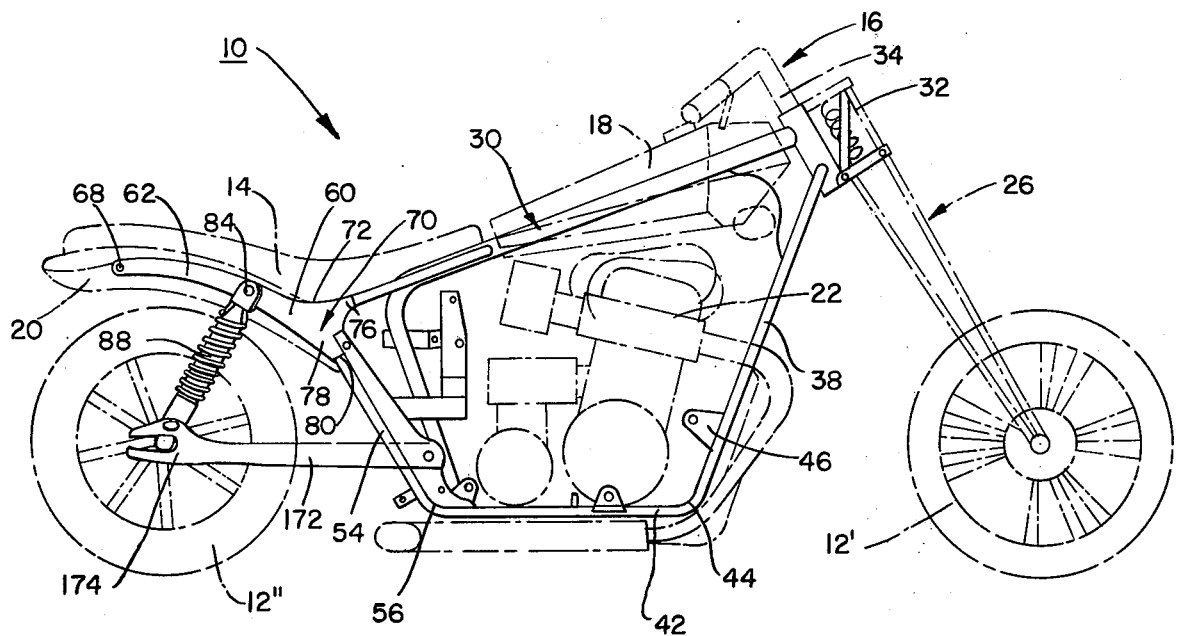
FIG. 1 is a side elevation of the motorcycle embodying the teaching of the present invention.

Shown in FIG. 1 is a chopper-type motorcycle 10 having the usual wheels 12, seat 14, handlebar 16, fuel tank 18 and rear fender 20. The chopper 10 also includes motor equipment 22 and suspension apparatus 26 as is usual to such motorcycles. Positions and directions referred to hereafter will be taken with reference to the usual motorcycle directions, thus, for example, the wheels 12 include a front wheel 12' and a rear wheel 12", and the like. It is also noted, that while points of connection and the like will be discussed with regard to the frame, such points and corners are mentioned merely for the sake of convenience, and unless otherwise noted, the frame is of unitary, integral construction.

Figure 2:
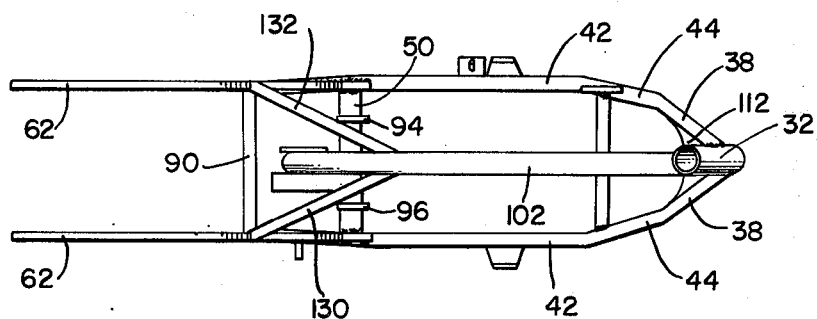
FIG. 2 is a plan view of the frame for the motorcycle embodying the teaching of the present invention.

The chopper 10 also comprises a unitary, integral frame 30 which has a polygonal perimeter and includes a tubular steering head 32 which accommodates steering tube 34 as shown in FIG. 1. A pair of rearwardly and outwardly declining down tubes 38 are each integrally attached at an upper end thereof to a lower portion of the steering head. The lower end of each down tube is integrally joined to a fore end of one of a pair of rearwardly directed axially extending spanner tubes 42 by an arcuate force corner 44 and has a force motor mount 46 securely mounted thereon as by welding or the like at a position suitable for mounting the motor equipment. As shown in FIG. 2, the down tube corners are each curved in two planes, one plane being downward and the other plane being outward of the longitudinal centerline of the motorcycle. A cross brace 50 is securely attached at each end thereof to a corresponding one of the axially extending spanner tubes to reinforce those spanner tubes and add further rigidity to the frame 30.

It is noted that the frame elements are herein referred to as tubular, but may assume other suitable structural configurations which serve a bracing function, and a tubular shape is only preferred and not intended to be limiting.

Figure 3:
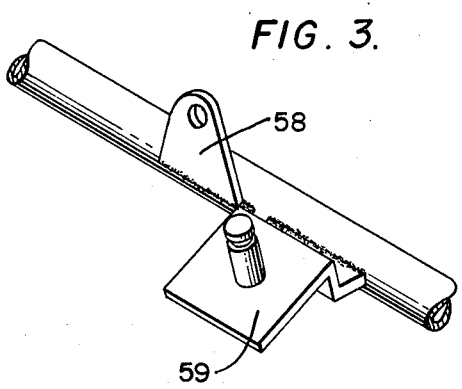
FIG. 3 is a perspective of a frame element having motor mounts thereon.

Each spanner tube is integrally joined at an aft end to one of a pair of upwardly and rearwardly inclined riser tubes 54 by an arcuate aft corner 56 which is preferably, but not necessarily, curved in only a vertical plane. As shown in FIG. 3, each spanner tube has a vertical motor mount bracket 58 and one tube has a stepped horizontal motor mount bracket 59 securely fastened thereto at a suitable location, as for example, near the forward end thereof as shown in FIG. 1. The horizontal motor mount has a threaded stub shaft thereon, and the vertical motor mount has a bolt-receiving opening defined therein in the preferred embodiment. However, other combinations could be used without departing from the teaching of the present invention.

A pair of generally yoke-shaped rear struts 60 are each attached to a corresponding riser tube at the upper end of that riser tube. As shown in FIG. 1, each rear strut has an arcuate body section 62 which has an upwardly curved contour which matches the contour of the rear fender 20 of the motorcycle. The rear end of each strut has a bolt-receiving hole 68 defined therein, and the forward end thereof has a furcated section 70 defined thereon and joined to the body section at an arcuate section 72 which is upwardly concave, as shown in FIG. 1. The furcated section 70 includes an upwardly extending ear 76 and a downwardly extending ear 78. As shown in FIG. 1, the downwardly extending ear 78 is securely attached to the upper end of a corresponding riser tube by a butt weld 80. The rear struts are facially opposed and in spaced parallelism with each other, and each has a fastening means connection 84 defined on the body section thereof to which a shock absorber 88 is attached. The fastening means connection 84 is positioned to be between the rear end of the strut and the furcated section thereof to be located rearwardly and above the arcuate section 72 for a purpose to be discussed below. The shock absorber is connected to the rear wheel axle in the usual manner and serves the usual function.

The curved body of each rear strut is fastened to the rear fender 20. The rear fender may also have some sort of shock absorbing system thereon and thus, road shocks or vibration will be transmitted to the rear fender via the rear wheel and the shock absorbers 88 to be further absorbed. Thus, the shock absorbing system of motorcycle 10 produces a very smooth and stable ride. However, each without a further shock absorbing system in the fender 20, the addition of the shock absorber 88 and the location of the connection thereof to the frame 30 produces a ride having a smoothness heretofore unknown in chopper-type motorcycles. The unitary nature of the frame 30 provides sufficient strength so the shock absorber can be connected to the fender connected rear strut without danger of unduly stressing the frame, as stresses induced in the rear strut will be efficiently distributed throughout the frame 30. Because of the stress distribution, none of the stresses, shocks, or the like are unduly concentrated near the driver's seat, and the ride of the motorcycle is thus felt by the driver as smooth and stable.

An upper tubular cross brace 90 is horizontally oriented and is attached at each end to one of the rear strut furcated sections, preferably at the upwardly extending ears 76. The cross brace 50 is also tubular and horizontally oriented beneath cross brace 90 to be in spaced parallelism with upper cross brace 90. The cross braces serve to rigidify the frame, and lower cross brace 50 has a pair of brackets 94 and 96 which are spaced apart longitudinally of the cross brace 50 and which serve as motor mounts.

Figure 5:
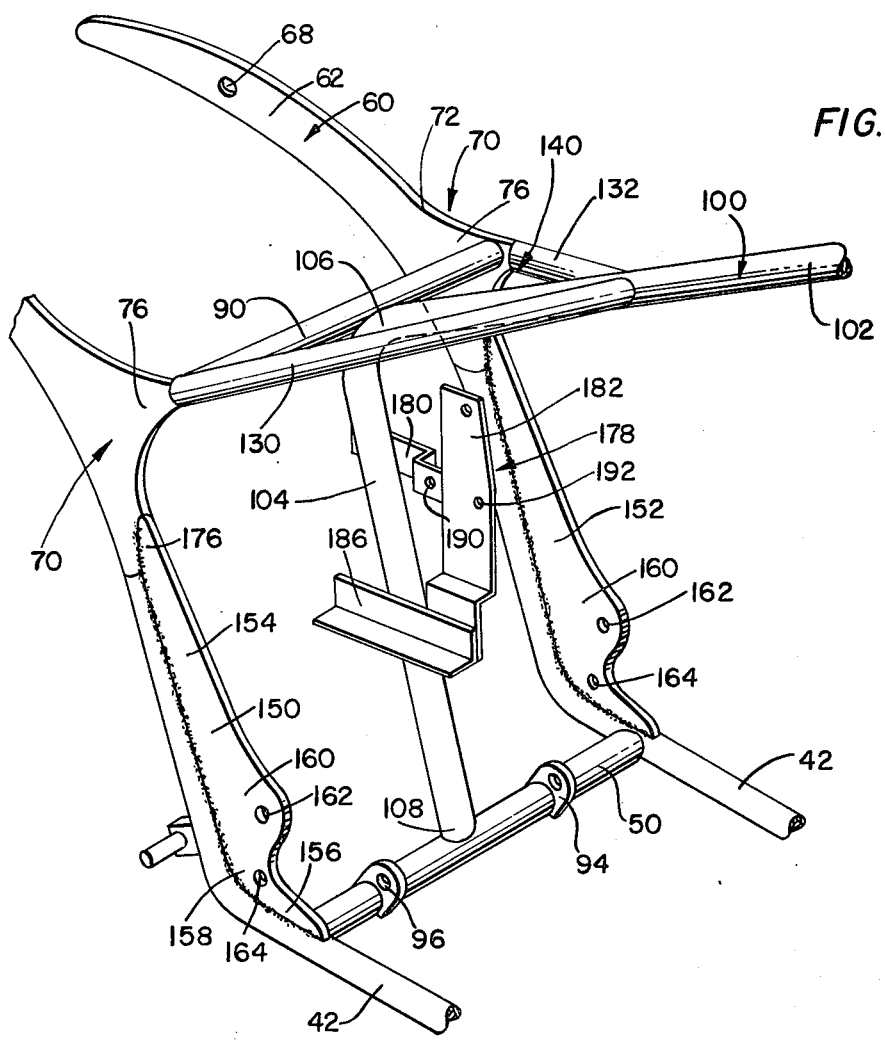
FIG. 5 is a partial perspective of the rear strut connected to the backbone and riser tubes of the frame of the motorcycle embodying the teaching of the present invention.

As best shown in FIG. 5, a rearwardly declining backbone 100 is tubular and includes a top section 102 and an upright section 104 joined together by an arcuate corner section 106. The backbone is secured, as by welding or the like, at a lower end 108 of the upright section to lower cross brace 50 between the motor mount brackets 94 and 96. The outer surface of arcuate corner section 106 may be secured to upper cross brace 90.

Figure 4:
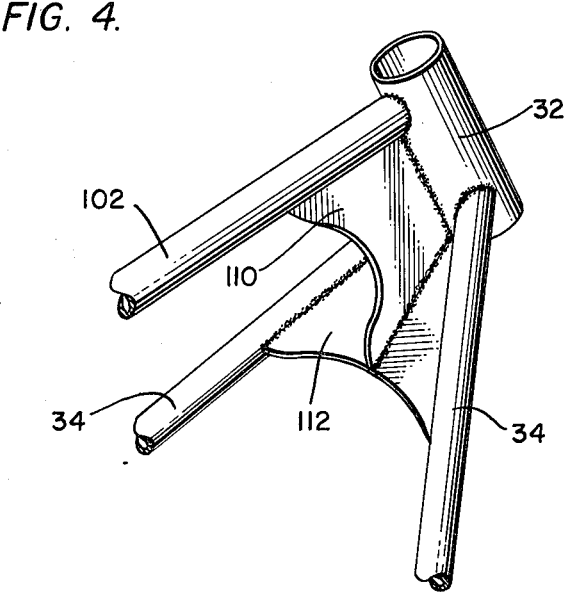
FIG. 4 is a perspective of a steering head utilized in the frame of the motorcycle embodying the teaching of the present invention.

The front end of the backbone top section 102 is welded, or otherwise securely attached, to the steering head at a location above and intermediate the attachment location of the down tubes as shown in FIG. 4. An upright head gusset 110 and a bottom head gusset 112 are welded to the steering head to rigidify the frame at this connection point. As shown in FIG. 4, the bottom gusset 112 is welded at the outer edges thereof to each of the down tubes, and the upright gusset is welded at the outer edges thereof to the steering head tube, the backbone and the bottom gusset. The gusset shapes shown in FIG. 4 are preferred, but other shapes can be used without departing from the teaching of the present invention.

As shown in FIG. 5, a pair of forwardly converging tubular seat rails 130 and 132 are each connected at one end to an upwardly extending ear of a corresponding rear strut and at the other end to the backbone top section 102. The seat rails, the upper cross brace 90, the backbone top section and the top edge of the furcated sections are all uniplanar to form a frame seat receiving section 140. As shown in FIG. 1, the motorcycle seat 14 is upwardly curved superjacent the seat section 140, and is accommodated thereon. The motorcycle driver sits at this location, and the seat section is thus below the connection of the backbone and the steering head, and is thus typical of choppers. The plane of the seat section 140 can be tilted as shown in FIG. 5 to comply with the chopper appearance.

Still referring to FIG. 5, it is seen that a pair of L-shaped swing arm plates 150 and 152 are each attached to the frame. Each swing arm plate is unitary and integral and has a long leg 154 and a short leg 156 attached to the bottom of the long leg by an arcuate corner 158. A bulging section 160 has a bolt-receiving opening 162 defined therethrough, and each corner has a bolt-receiving opening 164 defined therethrough for receiving motor mounting bolts. Coupling arms, such as swing arm 172, are shown in FIG. 1 to be connected at one end thereof to the swing arm plate by a bolt received in bolt opening 162, and at the other end to the rear axle via a coupling jaw 174. The upper end of each swing arm plate has a tail section 176 which extends beyond the upper terminal end of the riser tube, and is attached to an inner edge of a corresponding downwardly extending ear 78. The swing arm plates are facially opposed and are in spaced parallelism and are each edge welded, or otherwise edge attached, to the corresponding frame elements to further reinforce those elements and the butt welds attaching the rear struts to the riser tubes via the downwardly extending ears.

As shown in FIG. 5, a battery mount 178 is attached to the backbone upright section 104. An elongate, horizontal, stepped bracket 180 is attached at one end to the upright section 104 and at the other end to a vertical plate 182 which is stepped at the lower end thereof and connected thereat to a horizontally extending L-shaped ledge defining bracket 186. Bolt receiving openings 190 and 192 are defined in the horizontal and vertical brackets, respectively. As with the other attachments, the battery mount can be welded, or the like, to the corresponding frame elements.

The unitary nature of the frame 30 enables the shock absorbers to be connected thereto at a location above the seat receiving section 140 so that road shocks or the like are not transmitted directly to the rider, but are absorbed by the frame. Thus, even though the frame is rigid and unitary, road shocks are somewhat cushioned by the frame to produce a smooth, comfortable ride. Furthermore, the connection of the shock absorbers at a location spaced apart from the seat area produces a stable ride due to the force polygon formed by the frame, the shock absorbers and the coupling swing arms, which distributes the road shocks in a manner which produces a stable ride, but which will not transmit those shocks and vibrations directly to the driver. The shocks and vibrations are distributed throughout the frame rather than transmitted to the frame at a location at or near the driver's seat. Thus, with the rearward positioning of the shock absorber connection to the frame, the frame can achieve the stability and reliability of a unitary, integral construction, yet produce a stable, comfortable ride.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A unitary, integral chopper-type motorcycle frame comprising:
   an elongate steering head;
   a pair of elongate downwardly extending braces connected at one end thereof to said steering head;
   a pair of elongate axially extending spanner braces each connected at one end thereof to the other end of one of said downwardly extending braces;
   a pair of elongate riser braces each connected at one end thereof to the other end of one of said spanner braces;
   a pair of rear struts each including a yoke-like end section with an upwardly extending ear and a downwardly extending ear, said downwardly extending ear of each rear strut being connected to the other end of one of said riser braces;
   a pair of elongate non-parallel seat rails, each connected at one end to one of said rear strut upwardly extending ears and extending toward said steering head;
   a first elongate cross brace connecting said spanner braces together, and a second elongate cross brace connecting said rear struts together;
   a backbone including an elongate upright section having one end connected to said first cross brace and an inclined top section connected at one end thereof to the other end of said upright section, the other end of said backbone top section being connected to said steering head, said seat rails having the other ends thereof connected to said backbone top section;
   said seat rails being coplanar with said backbone top section and said second cross brace, thereby defining a seat section, said seat section being rearwardly and downwardly tilted, said backbone top section inclining downwardly from said steering head so that said seat section is below the plane of said steering head;

a shock absorber connected at one end thereof to one wheel of the motorcycle and connected at the other end thereof to one of said rear struts at a location spaced apart from said seat section and above said yoke-like end section upwardly extending ear; and mounts for mounting a motor and the parts thereof on the frame.

2. The chopper-type motorcycle of claim 1, wherein said shock absorber connection to said rear strut is positioned above the plane defined by said seat section.

3. The chopper-type motorcycle frame of claim 2, further including a pair of swing arm plates each attached to one of said riser braces.

4. The chopper-type motorcycle frame of claim 2, wherein said swing arm plates are each attached to one of said rear strut downwardly extending ears.

5. The chopper-type motorcycle frame of claim 4, further including an elongate swing arm connected at one end thereof to one of said swing arm plates and at the other end thereof to the motorcycle rear wheel.

6. The chopper-type motorcycle frame of claim 1, wherein the motorcycle includes a fender and said rear struts are each connected to the fender and are shaped to correspond to the shape of that fender.

7. The chopper-type motorcycle frame of claim 1, further including a battery mount connected to said backbone upright section beneath said seat section.

8. The chopper-type motorcycle frame of claim 1, further including a second shock absorber connected to the one wheel of the motorcycle and to the other one of said rear struts.

9. The chopper-type motorcycle frame of claim 1, wherein the connection of said shock absorber to said rear strut is located behind said seat section.

* * * * *